United States Patent
Kim

(10) Patent No.: US 10,871,625 B2
(45) Date of Patent: Dec. 22, 2020

(54) CAMERA MODULE AND CAMERA FOR VEHICLE

(71) Applicant: LG Innotek Co., Ltd., Seoul (KR)

(72) Inventor: Dae Hwan Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 319 days.

(21) Appl. No.: 15/772,429

(22) PCT Filed: Oct. 28, 2016

(86) PCT No.: PCT/KR2016/012208
§ 371 (c)(1),
(2) Date: Apr. 30, 2018

(87) PCT Pub. No.: WO2017/074082
PCT Pub. Date: May 4, 2017

(65) Prior Publication Data
US 2018/0314032 A1   Nov. 1, 2018

(30) Foreign Application Priority Data

Oct. 30, 2015  (KR) .......................... 10-2015-0152223

(51) Int. Cl.
*G03B 17/55* (2006.01)
*G02B 7/02* (2006.01)
(Continued)

(52) U.S. Cl.
CPC .............. *G02B 7/028* (2013.01); *B60R 11/04* (2013.01); *G02B 7/021* (2013.01);
(Continued)

(58) Field of Classification Search
CPC .... G02B 27/00; G02B 27/0025; G02B 7/028; G02B 27/02; G02B 27/0006; G02B 7/021;
(Continued)

(56) References Cited

U.S. PATENT DOCUMENTS 5,610,756 A * 3/1997 Lynam ....................... B60R 1/02
359/267
5,854,708 A * 12/1998 Komatsu ............... C03C 17/256
359/512
(Continued)

FOREIGN PATENT DOCUMENTS

CN   1268254 A   9/2000
CN   1497634 A   5/2004
(Continued)

OTHER PUBLICATIONS

Examiner provided machine translation of Lee, KR 20100019676 A (Year: 2010).*

(Continued)

*Primary Examiner* — Balram T Parbadia
(74) *Attorney, Agent, or Firm* — Saliwanchik, Lloyd & Eisenschenk

(57) ABSTRACT

An embodiment of the present invention relates to a camera module comprising: a lens a heater disposed on a surface of the lens; and a switch electrode which selectively comes into contact with the heater, wherein a current is supplied to the heater through the switch electrode when the switch electrode and the heater are in contact with each other, the current supply to the heater is cut off when the switch electrode and the heater are spaced apart from each other, and the switch electrode is spaced apart from the heater when the lens reaches a predetermined temperature or higher.

19 Claims, 4 Drawing Sheets

(51) Int. Cl.
*G02B 27/00* (2006.01)
*H05B 1/02* (2006.01)
*B60R 11/04* (2006.01)
*H05B 3/84* (2006.01)

(52) U.S. Cl.
CPC ......... *G02B 27/0006* (2013.01); *G03B 17/55* (2013.01); *H05B 1/0227* (2013.01); *H05B 3/84* (2013.01); *H05B 1/0202* (2013.01)

(58) Field of Classification Search
CPC ........ G03B 17/02; G03B 17/55; H04N 5/225; H04N 5/2254; H05B 3/84; H05B 1/0227; H05B 1/0202; B60R 11/04; H01H 37/54
See application file for complete search history.

(56) References Cited

U.S. PATENT DOCUMENTS

| | | | | |
|---|---|---|---|---|
| 5,998,051 | A * | 12/1999 | Poirier | H01H 37/043 429/7 |
| 6,601,983 | B1 | 8/2003 | Runfola et al. | |
| 6,603,612 | B2 * | 8/2003 | Nakano | G11B 7/1374 359/696 |
| 8,217,306 | B2 * | 7/2012 | Inoue | F21V 29/90 219/202 |
| 8,563,898 | B1 * | 10/2013 | Wright | F21V 29/90 219/202 |
| 2004/0223074 | A1 * | 11/2004 | Takada | H04N 5/2253 348/360 |
| 2004/0252004 | A1 * | 12/2004 | Hashimoto | H01H 37/52 337/85 |
| 2005/0206780 | A1 * | 9/2005 | Iwasaki | H04N 5/2254 348/373 |
| 2006/0171704 | A1 * | 8/2006 | Bingle | H04N 7/183 396/419 |
| 2006/0278803 | A1 * | 12/2006 | Mochizuki | B60Q 1/0017 248/538 |
| 2007/0058070 | A1 * | 3/2007 | Chen | G02B 7/102 348/340 |
| 2008/0100933 | A1 * | 5/2008 | Yuan | G02B 7/028 359/820 |
| 2011/0199530 | A1 * | 8/2011 | Kosaka | H04N 5/2251 348/340 |
| 2012/0201031 | A1 * | 8/2012 | Marley | F21S 41/28 362/294 |
| 2012/0212806 | A1 * | 8/2012 | Shibata | G02B 13/14 359/356 |
| 2013/0038783 | A1 * | 2/2013 | Shimizu | H04N 5/2254 348/360 |
| 2013/0271641 | A1 * | 10/2013 | Calvet | G02B 7/022 348/340 |
| 2014/0298642 | A1 * | 10/2014 | Sesti | G02B 27/0025 29/592.1 |
| 2015/0234153 | A1 * | 8/2015 | Park | G02B 17/0694 348/360 |
| 2016/0215952 | A1 * | 7/2016 | Dunn | F21S 45/60 |
| 2017/0038661 | A1 * | 2/2017 | Ha | G03B 3/10 |

FOREIGN PATENT DOCUMENTS

| | | |
|---|---|---|
| CN | 1574149 A | 2/2005 |
| JP | 56-168619 A | 12/1981 |
| KR | 10-2004-0032057 A | 4/2004 |
| KR | 10-2004-0032467 A | 4/2004 |
| KR | 10-2010-0019676 A | 2/2010 |
| KR | 10-2011-0068442 A | 6/2011 |

OTHER PUBLICATIONS

International Search Report in International Application No. PCT/KR2016/012208, filed Oct. 28, 2016.
Office Action dated Mar. 16, 2020 in Chinese Application No. 201680063759.1.

* cited by examiner

CAMERA MODULE AND CAMERA FOR VEHICLE

CROSS-REFERENCE TO RELATED APPLICATIONS

This application is the U.S. national stage application of International Patent Application No. PCT/KR2016/012208, filed Oct. 28, 2016, which claims priority to Korean Application No. 10-2015-0152223, filed Oct. 30, 2015, the disclosures of each of which are incorporated herein by reference in their entirety.

TECHNICAL FIELD

The teachings in accordance with exemplary and non-limiting embodiments of this invention relate generally to a camera module and a camera for vehicle (hereinafter referred to as "vehicle camera"). The present invention relates to a camera module mounted with a heater configured to control the temperature of a lens, and more particularly to a camera module mounted with a heater configured to control the temperature of a lens in which a heater is intrinsically embedded inside the lens to allow turning on/off the heater without changing the size of a lens assembly and additionally performing a temperature control by adding an electrode and a temperature control function to an existing spacer.

BACKGROUND ART

The current trend is that customers consistently request a heater be installed on a camera lens to remove frost formed thereon. A camera lens with a frost-remover intrinsically mounted therein is not yet marketed, and lots of businesses are currently known to develop related technologies which are however limited to a simple structure to wrap a camera with a hot wire.

That is, there have been no such temperature control technologies, but only technologies that have existed were in a simple shape of inter-product coupling manner where a camera and a heater were separately developed and coupled later. Furthermore, no system has existed that prevents a lens from being heated when a heater is in operation. In addition, there was a high possibility of side effects occurring such as degraded camera performance due to excessive overheat of a heater. The said system also suffered from an inevitable disadvantage of increased size in camera module in order to realize the temperature control system.

DETAILED DESCRIPTION OF THE INVENTION

Technical Subject

Exemplary embodiments of the present invention are provided to solve the aforementioned disadvantages/problems, and it is an object to provide a camera module mounted with a heater capable of controlling a temperature of a lens, configured to increase frost removal effect by increasing heat transfer efficiency by placing a heater nearer to a lens through intrinsic installation of the lens in the heater, and adequate to be applicable to a small vehicle camera because of using a lens mounted with a heater and because of a retainer capable of covering the heater to thereby increase a mechanical stability of heater.

Furthermore, it is another object to provide a camera module mounted with a heater capable of controlling a temperature of a lens in order to provide a heater driving stability and to prevent a camera from being degraded in performance by additionally realizing a temperature control by turning on/off the heater without change in size of lens assembly by adding an electrode and a temperature control function to a previously used spacer when a structure of a switch spacer is applied.

Technical Solution

In one general aspect of the present invention, there is provided a camera module comprising: a lens;
a heater disposed on a surface of the lens; and
a switch electrode which selectively comes into contact with the heater, wherein a current is supplied to the heater through the switch electrode when the switch electrode and the heater are in contact with each other, the current supply to the heater is cut off when the switch electrode and the heater are spaced apart from each other, and the switch electrode is spaced apart from the heater when the lens reaches a predetermined temperature or higher.

Preferably, but not necessarily, the switch electrode may include a first metal part selectively contacting at one surface the heater, and a second metal part disposed at the other surface of the first metal part, wherein a thermal expansion coefficient of the second metal part may be higher than that of the first metal part.

Preferably, but not necessarily, the switch electrode may be convexly formed toward the lens.

Preferably, but not necessarily, an end at one side of the switch electrode may be connected to a conductive line, an end at the other side of the switch electrode may be formed with a free terminal, ends of both sides of the switch electrode may be spaced apart from the heater, a portion of the switch electrode may be disposed nearer to a heater side than ends of both sides of the switch electrode.

Preferably, but not necessarily, an end at the other side of the switch electrode may be disposed nearer to the heater side than an end at one side of the switch electrode.

Preferably, but not necessarily, each of the first metal part and the second metal part may have a corresponding shape and corresponding size.

Preferably, but not necessarily, the lens may be an outermost lens disposed at an outermost place of the camera module, and the camera module may further include a barrel, a plurality of lenses accommodated into the barrel, and a spacer interposed between the barrel and the outermost lens, wherein the switch electrode may be disposed at the spacer.

Preferably, but not necessarily, the camera module may further include a PCB (Printed Circuit Board) disposed with an image sensor, and a conductive line electrically connecting the switch electrode to the PCB and extended from a lateral surface of the spacer, wherein the barrel may include a conductive line receptor through which the conductive line passes.

Preferably, but not necessarily, the conductive line receptor may include a groove part formed by allowing an outer circumferential surface of the barrel to be recessively concaved in toward an inner side.

Preferably, but not necessarily, the camera module may further include a retainer fixing the outermost lens and the spacer and accommodating the barrel at an inner side, wherein a sealing member may be interposed between the outermost lens and the retainer.

Preferably, but not necessarily, the spacer may include a through hole, wherein the switch electrode may be formed in a pair to be disposed at both sides of the through hole.

Preferably, but not necessarily, the heater may be disposed at an outside of the outermost lens.

Preferably, but not necessarily, the switch electrode may include a contact extension part selectively surface-contacting the heater.

Preferably, but not necessarily, the heater may be a transparent heater.

In another general aspect of the present invention, there is provided a camera for vehicle (vehicle camera) coupled to a vehicle, comprising:

a lens;

a heater disposed at a surface of the lens; and a switch electrode selectively contacting the heater, wherein when the switch and the heater come into contact, the heater is supplied with a current through the switch electrode, and when the switch electrode and the heater are spaced apart, the heater is cut off with the current supply, and the switch electrode is spaced apart from the heater when the lens reaches a predetermined temperature or higher.

In still another aspect of the present invention, there is provided a camera module, comprising:

a lens;

a heater disposed at a surface of the lens; and a switch spacer selectively contacting the heater to perform the ON/OFF control and temperature control of the heater.

Preferably, but not necessarily, the lens may be disposed at an inside of a barrel.

Preferably, but not necessarily, the barrel may be formed at a lateral surface with a groove part functioning as a passage connecting a cable from the switch spacer to a PCB.

Preferably, but not necessarily, the camera module may further comprise a retainer coupled to the barrel to fix the switch spacer.

Preferably, but not necessarily, an electric wire of the heater may be connected to a camera side through between the barrel and the retainer.

Preferably, but not necessarily, the heater may be a transparent heater.

Preferably, but not necessarily, the switch spacer may turn off the heater when a temperature of the heater reaches a predetermined temperature or higher.

Preferably, but not necessarily, the switch spacer may include a switch electrode contacting the heater, and a conductive line which is an electric passage connected to the switch electrode to be connected up to the PCB.

Preferably, but not necessarily, the switch electrode may include a first metal part having a low thermal expansion coefficient and a second metal part having a higher thermal expansion coefficient than that of the first metal part.

Preferably, but not necessarily, the shape of the switch electrode is changed by the second metal part having a higher thermal expansion coefficient to disconnect a contact with the heater when a temperature of the lens increases.

Advantageous Effects

According to the present invention, a lens is embedded in a heater to allow the heater to be disposed nearer to the lens, whereby efficiency of thermal transfer can be enhanced to effectively remove frost. Furthermore, a lens mounted on a heater can be utilized to be applicable to a small sized vehicle camera, and the heater can be covered by a retainer to enhance mechanical stability of the heater. Still further-more, the switch spacer structure of the present invention is such that the previously-used spacer can be added with an electrode and temperature control function to enable turning on/off the heater without change in size of lens assembly and to additionally realized a temperature control, whereby heater driving stability and camera performance degradation can be effectively prevented.

BEST MODE

Figure 1:
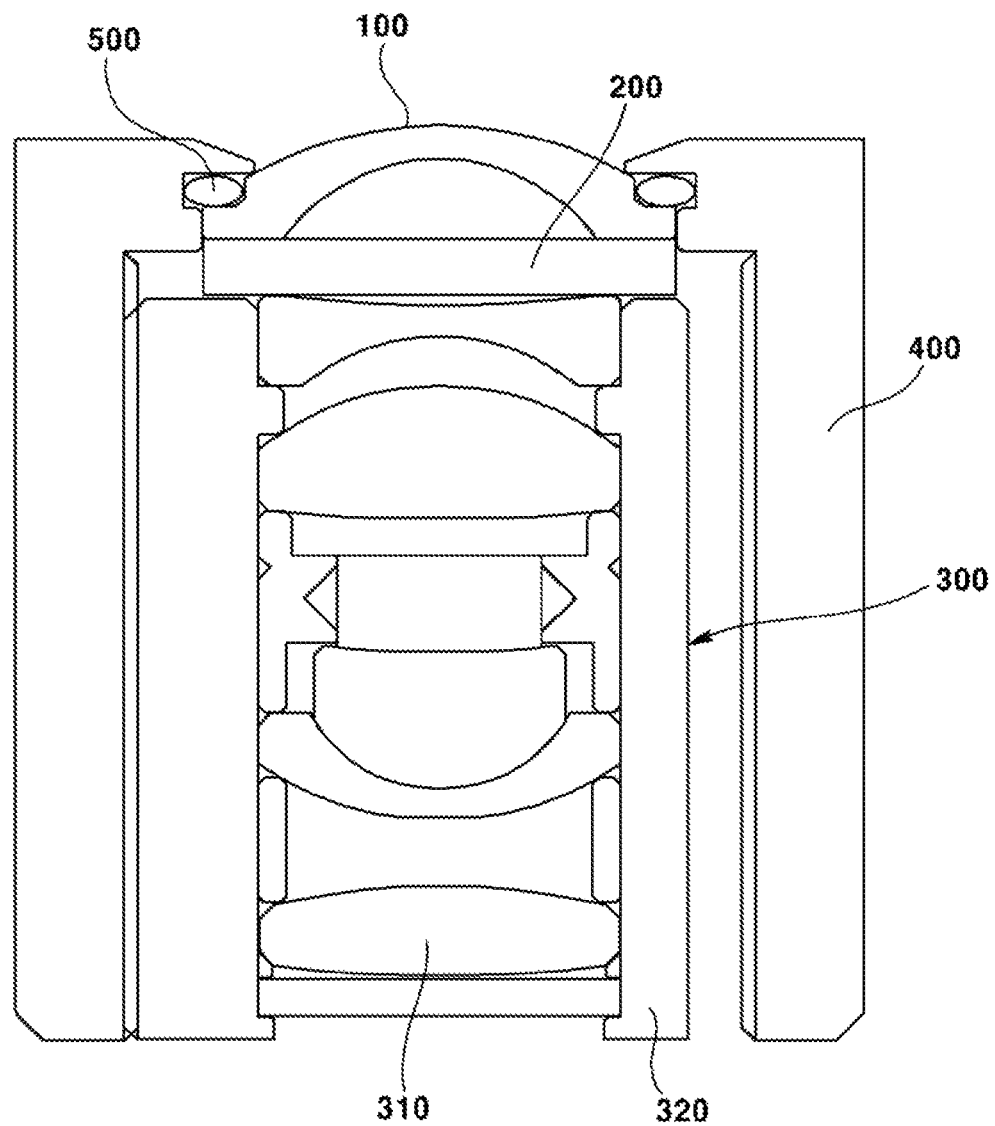
FIG. 1 is a schematic view illustrating a structure of a switch spacer controlling a heater in response to a temperature included in a lens assembly according to an exemplary embodiment of the present invention.

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

FIG. 1 is a schematic view illustrating a structure of a switch spacer controlling a heater in response to a temperature included in a lens assembly according to an exemplary embodiment of the present invention.

A structure of a switch spacer (200) controlling a heater in response to a temperature included in a lens assembly according to an exemplary embodiment of the present invention is illustrated in FIG. 1.

A heater (not shown) is mounted on an outermost lens (100), which is then contacted to the switch spacer (200) to allow a current to flow, whereby a control is performed.

A lens module (300) may be disposed at a bottom surface of the switch spacer (200). The lens module (300) may include a lens (310) and a barrel (320).

A heater may be embedded inside a lens assembly, and the barrel (320) may be embedded with a lens and a spacer, and a retainer (400) may fix the lens and the switch spacer (200) by being coupled with the barrel (320). Furthermore, a sealing member (500) may be interposed between an outermost lens (100) and the retainer (400). The barrel (320) may be accommodated with a plurality of lenses (310).

The heater may be a transparent heater. An electric wire of heater may be connected to a camera side through between the barrel (320) and the retainer (400), and coupling between the camera body and the lens assembly may be implemented at the retainer (400) to prevent the heater, the electric wire of heater and electrode from being exposed outside of an entire camera structure.

Thus, through this structure, the ON/OFF of heater can be controlled by applying the switch spacer (200) different from that of the existing model.

The heater may be disposed on a surface of the outermost lens (100). The heater may be disposed at an outside of the outermost lens (100). The switch electrode (210) may selectively contact the heater. At this time when the switch electrode (210) and the heater come into contact, the heater may be supplied with a current through the switch electrode (210). Furthermore, when the switch electrode (210) and the heater are spaced apart, the heater may be cut off of supply of a current. The switch electrode (210) may be spaced apart when the outermost lens (100) reaches a predetermined temperature or higher.

The camera module according to an exemplary embodiment of the present invention may further comprise a PCB (Printed Circuit Board, not shown). The PCB may be disposed with an image sensor (not shown). The image sensor may be aligned with the outermost lens (100) and a plurality of lenses (310). The outermost lens (100), the switch spacer (200), the plurality of lenses (310) and the image sensor may be sequentially aligned in that order based on an optical axis.

The retainer (400) can fix the outermost lens (100) and the spacer (220). The retainer (400) can accommodate the barrel (320) at an inner side thereof a sealing member (500) may be interposed between the outermost lens (100) and the retainer (400).

Figure 2:
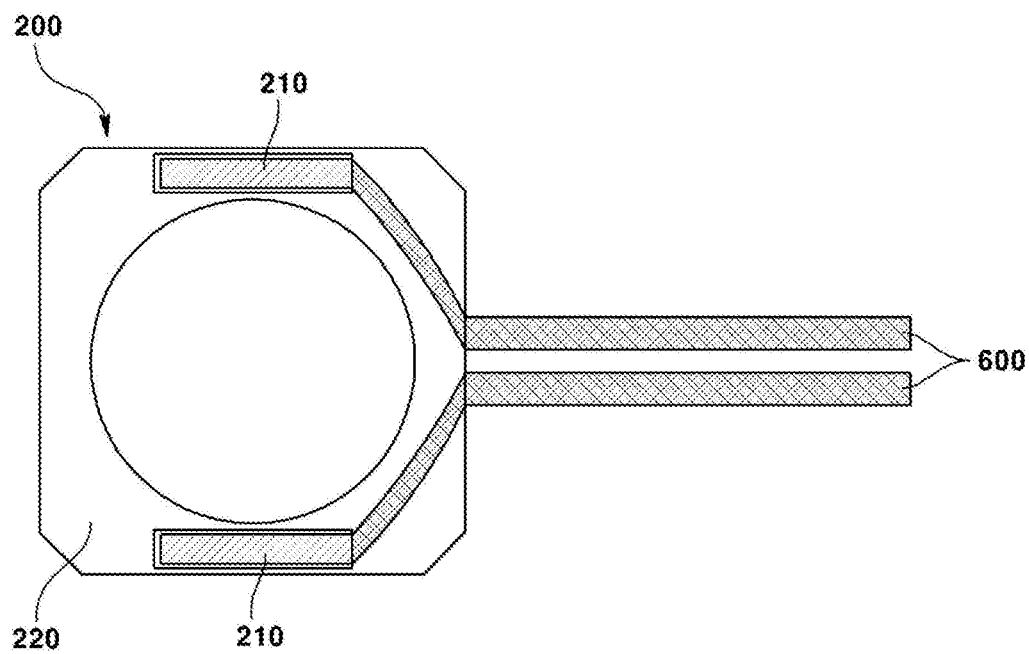
FIG. 2 is a plan view illustrating a switch spacer.

FIG. 2 is a plan view illustrating a switch spacer.

Referring to FIG. 2, in a switch structure applied to the spacer (220), a controller capable of turning off the heater may be required to prevent the camera module from suffering from a bad image quality due to excessive heating of heater applied to the lens when the lens reaches a predetermined temperature or higher. Although temperature measurement and temperature ON/OFF functions must be equipped in order to constitute a structure of thus-mentioned controller, a switch capable of performing two functions at a time may be installed on the spacer (220) due to limitation on the small-sized lens assembly to thereby prevent the lens assembly from being increased in size and to control the heater.

Particularly, as shown in the plan view of FIG. 2, the switch spacer (200) of the present invention may have a structure in which a conductive line (600) of electric passage is mounted to connect the switch electrode (210) to the PCB. The conductive line (600) can electrically connect the switch electrode (210) and the PCB. The conductive line (600) may be extended from a lateral surface of the spacer (220). The spacer (220) may be disposed between the barrel (320) and the outermost lens (100). The switch electrode (210) may be disposed at the spacer (220). The spacer (220) may include an accommodation part moveably accommodate the switch electrode (210).

The spacer (220) may include a through hole. The switch electrode (210) may be formed in a pair to be disposed at both sides of the through hole.

Figure 3:
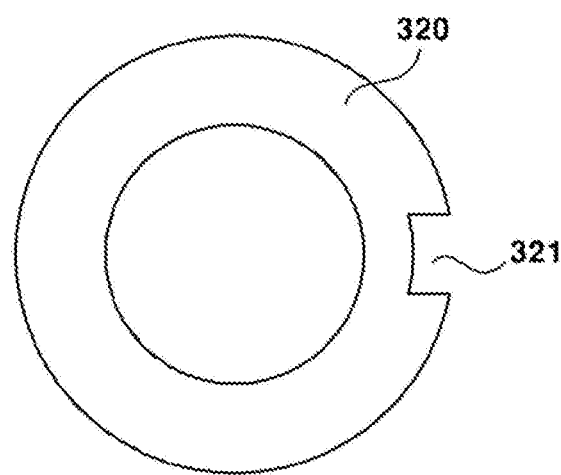
FIG. 3 is a schematic view illustrating a structure of a barrel viewed from above.
Figure 4:
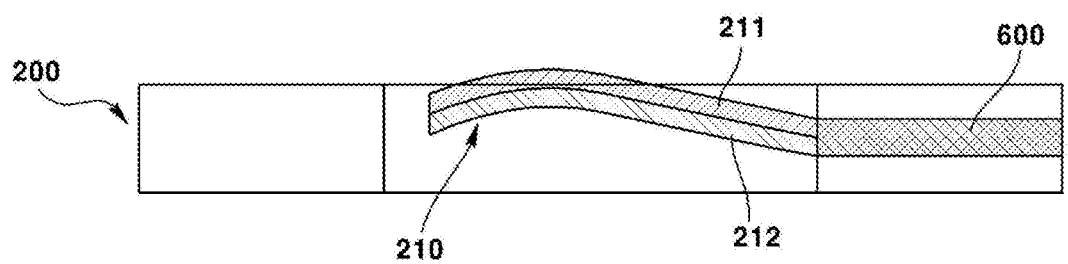
FIGS. 4 to 7 are cross-sectional views illustrating a switch spacer.

FIG. 3 is a schematic view illustrating a structure of a barrel viewed from above.

Referring to FIG. 3, the barrel may function as a passage by vertically forming a groove part (321) at a lateral surface of the barrel (320) to allow a cable and the conductive line (600) coming from the switch spacer (200) to be connected to the PCB. The barrel (320) may include a conductive line receptor through which the conductive line (600) passes. The conductive line receptor may include a groove part (321) formed by allowing an outer circumferential surface of the barrel (320) to be recessively concaved in toward an inner side.

FIGS. 4 to 7 are cross-sectional views illustrating a switch spacer.

As illustrated in FIGS. 4 to 7, in the structure of the switch spacer (200), the switch electrode, in which a first metal part (211) and a second metal part (212) having a thermal expansion coefficient different from that of the first metal part are combined, as shown in the cross-sectional views, may perform a dual function as a switch and an electrode at the same time. Furthermore, the switch electrode (210) may be connected by the conductive line (600) which is an electric passage.

Figure 5:
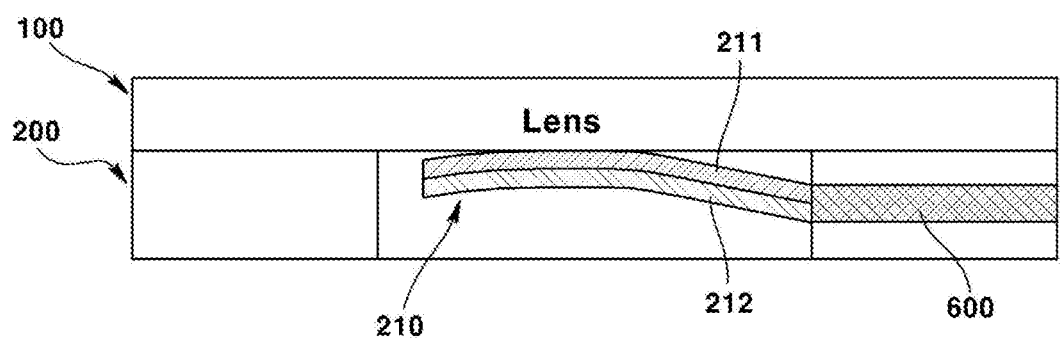
Figure 6:
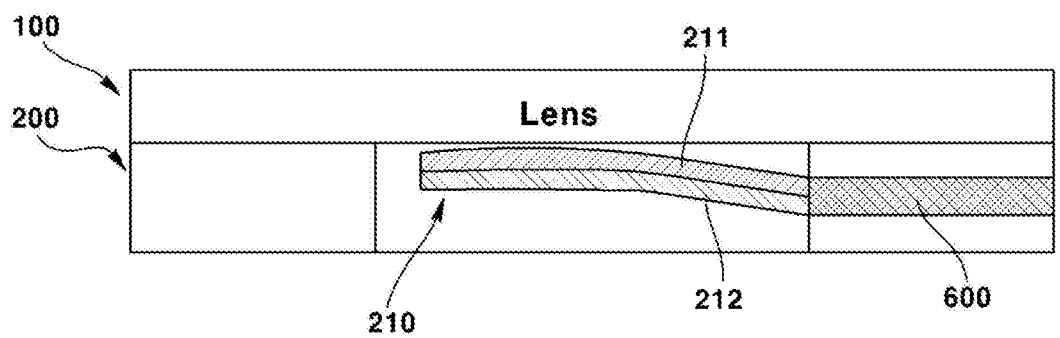

That is, as illustrated in FIG. 5, the switch electrode (210) formed with the first metal part (211) and the second metal part (212) of switch spacer (200) when the lenses are coupled may contact the outermost lens (100) and connected by the conductive line (600). Furthermore, as shown in FIG. 6, when the lens reaches a predetermined temperature, the shape of the switch is changed by material of the second metal part (212) having a higher thermal expansion coefficient to disconnect the contact with the lens. When the temperature of the lens decreases, the switch returns to its original shape.

Figure 7:
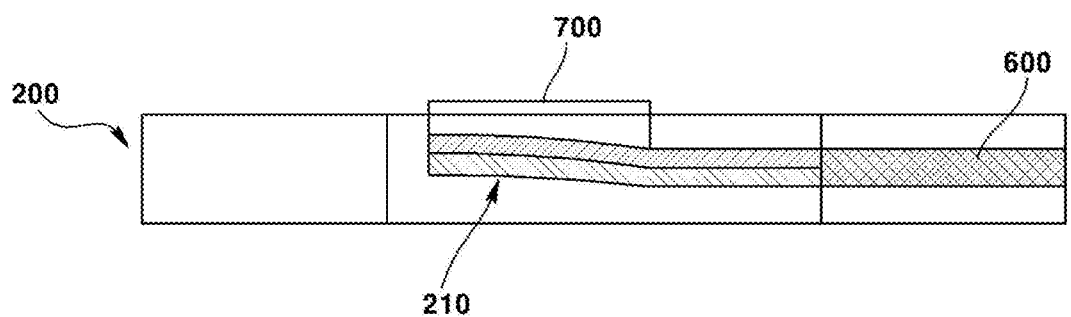

Meantime, as shown in the cross-section of switch spacer of FIG. 7, a contact expansion part (700) may be added to the switch electrode (210) to increase a contact surface with the lens whereby a current flow can be improved, and a temperature control effect can be expected due to difference of thermal expansion coefficient. The contact expansion part (700) may selectively surface-contact the heater. The switch electrode (210) may include a contact expansion part (700) selectively surface-contacting the heater.

As detailed in the foregoing statement, in terms of configurations that differentiate from the prior art, to begin with, the heater is intrinsically embedded in the lens to allow the heater to be nearer to the lens, whereby the heat transfer efficiency can be enhanced to thereby increase the frost removal effect.

Furthermore, use of heater-mounted lens enables the present invention to be applicable to a small-sized camera, and mechanical stability of heater can be increased by the retainer that covers the heater.

Still furthermore, through the structure of the switch spacer (200) according to the present invention, the previously-existent, used spacer is added with electrode and temperature control functions to allow the heater to be turned on/off without changes in size of lens assembly and to be controlled in temperature, whereby heater driving stability and prevention of camera performance degradation can be accomplished at the same time.

The switch electrode (210) may include a first metal part (211) selectively contacting the heater at one surface. The switch electrode (210) may include a second metal part (212) disposed at the other surface of the first metal part (211). The thermal expansion coefficient of the second metal part (212) may be higher than that of the first metal part (211). Each of the first and second metal parts (211, 212) may have a corresponding shape and size.

The switch electrode (210) may be convexly formed toward the outermost lens (100). An end at one side of the switch electrode (210) may be connected to the conductive line (600), and an end at the other side of the switch electrode (210) may be formed with a free terminal. At this time, both ends of the switch electrode (210) may be spaced apart from the heater. Furthermore, a portion of the switch electrode (210) may be disposed nearer to a heater side than ends of both sides of the switch electrode (210). An end at the other side of the switch electrode (210) may be disposed nearer to a heater side than an end at one side of the switch electrode (210).

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the term "includes", "including", "comprises" and/or "comprising" as used herein, the mentioned component, step, operation and/or device is not excluded from presence or addition of one or more other components, steps, operations and/or devices.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A camera module, comprising:
   a lens;
   a spacer disposed under the lens and including a through hole;
   a heater disposed on a surface of the lens; and
   a switch electrode that selectively comes into contact with the heater, the switch electrode being disposed on the spacer,
   wherein a current is supplied to the heater through the switch electrode when the switch electrode and the heater are in contact with each other,
   wherein the current supply to the heater is cut off when the switch electrode and the heater are spaced apart from each other,
   wherein the switch electrode is spaced apart from the heater when the lens reaches a predetermined temperature or higher, and
   wherein the switch electrode is formed in a pair disposed at both sides of the through hole of the spacer.

2. The camera module of claim 1, wherein the switch electrode includes a first metal part having one surface that selectively contacts the heater, and a second metal part disposed at a second surface of the first metal part, wherein a thermal expansion coefficient of the second metal part is higher than that of the first metal part.

3. The camera module of claim 2, wherein each of the first metal part and the second metal part has a corresponding shape and corresponding size.

4. The camera module of claim 1, wherein the switch electrode is convexly formed toward the lens.

5. A camera module, comprising:
   a lens;
   a heater disposed on a surface of the lens; and
   a switch electrode that selectively comes into contact with the heater,
   wherein a current is supplied to the heater through the switch electrode when the switch electrode and the heater are in contact with each other,
   wherein the current supply to the heater is cut off when the switch electrode and the heater are spaced apart from each other,
   wherein the switch electrode is spaced apart from the heater when the lens reaches a predetermined temperature or higher, and
   wherein an end at a first side of the switch electrode is connected to a conductive line, an end at a second side of the switch electrode is formed with a free terminal, the end at the first side of the switch electrode and the end at the second side of the switch electrode are both spaced apart from the heater, and a portion of the switch electrode is disposed nearer to a heater side than are both the end at the first side of the switch electrode and the end at the second side of the switch electrode.

6. The camera module of claim 5, wherein the end at the second side of the switch electrode is disposed nearer to the heater side than is the end at the first side of the switch electrode.

7. A camera module, comprising:
   a lens;
   a heater disposed on a surface of the lens; and
   a switch electrode that selectively comes into contact with the heater,
   wherein a current is supplied to the heater through the switch electrode when the switch electrode and the heater are in contact with each other,
   wherein the current supply to the heater is cut off when the switch electrode and the heater are spaced apart from each other,
   wherein the switch electrode is spaced apart from the heater when the lens reaches a predetermined temperature or higher, wherein the lens is an outermost lens disposed at an outermost place of the camera module, and the camera module includes a barrel, a plurality of inner lenses accommodated into the barrel, and a spacer interposed between the barrel and the outermost lens, and wherein the switch electrode is disposed at the spacer.

8. The camera module of claim 7, comprising a PCB (Printed Circuit Board) disposed with an image sensor, and a conductive line electrically connecting the switch electrode to the PCB and extended from a lateral surface of the spacer, wherein the barrel includes a conductive line receptor through which the conductive line passes.

9. The camera module of claim 8, wherein the conductive line receptor includes a groove part formed by allowing an outer circumferential surface of the barrel to be recessively concaved in toward an inner side.

10. The camera module of claim 7, comprising a retainer fixing the outermost lens and the spacer and accommodating the barrel at an inner side, wherein a sealing member is interposed between the outermost lens and the retainer.

11. The camera module of claim 7, wherein the spacer includes a through hole, and wherein the switch electrode is formed in a pair to be disposed at both sides of the through hole.

12. A vehicle camera coupled to a vehicle, comprising:
a lens;
a spacer disposed under the lens and including a through hole;
a heater disposed at a surface of the lens; and
a switch electrode selectively contacting the heater, the switch electrode being disposed on the spacer,
wherein when the switch and the heater come into contact, the heater is supplied with a current through the switch electrode,
wherein when the switch electrode and the heater are spaced apart, the heater is cut off with the current supply,
wherein the switch electrode is spaced apart from the heater when the lens reaches a predetermined temperature or higher, and
wherein the switch electrode is formed in a pair disposed at both sides of the through hole.

13. A camera module, comprising:
a retainer;
an outermost lens disposed within the retainer;
a heater disposed on a surface of the outermost lens;
a barrel disposed within the retainer and under the outermost lens;
a plurality of inner lenses accommodated into the barrel;
a PCB (Printed Circuit Board) disposed under the plurality of inner lenses with an image sensor;
a spacer interposed between the barrel and the outermost lens;
a switch electrode that selectively comes into contact with the heater, the switch electrode being disposed on the spacer; and
a conductive line electrically connecting the switch electrode to the PCB and extended from a lateral surface of the spacer,
wherein the conductive line is disposed between the barrel and retainer,
wherein a current is supplied to the heater through the switch electrode when the switch electrode and the heater are in contact with each other,
wherein the current supply to the heater is cut off when the switch electrode and the heater are spaced apart from each other, wherein the switch electrode is spaced apart from the heater when the outermost lens reaches a predetermined temperature or higher,
wherein the spacer includes a through hole, and
wherein the switch electrode is formed in a pair disposed at both sides of the through hole.

14. The camera module of claim 13,
wherein the switch electrode includes a first metal part having one surface that selectively contacts the heater, and a second metal part disposed at a second surface of the first metal part,
wherein a thermal expansion coefficient of the second metal part is higher than that of the first metal part, and
wherein each of the first metal part and the second metal part has a corresponding shape and corresponding size.

15. The camera module of claim 13,
wherein the switch electrode is convexly formed toward the lens.

16. A camera module, comprising:
a retainer;
an outermost lens disposed within the retainer;
a heater disposed on a surface of the outermost lens;
a barrel disposed within the retainer and under the outermost lens;
a plurality of inner lenses accommodated into the barrel;
a PCB (Printed Circuit Board) disposed under the plurality of inner lenses with an image sensor;
a spacer interposed between the barrel and the outermost lens;
a switch electrode that selectively comes into contact with the heater disposed at the spacer; and
a conductive line electrically connecting the switch electrode to the PCB and extended from a lateral surface of the spacer,
wherein the conductive line is disposed between the barrel and retainer,
wherein a current is supplied to the heater through the switch electrode when the switch electrode and the heater are in contact with each other,
wherein the current supply to the heater is cut off when the switch electrode and the heater are spaced apart from each other,
wherein the switch electrode is spaced apart from the heater when the outermost lens reaches a predetermined temperature or higher,
wherein the conductive line is connected to an end at a first side of the switch electrode,
wherein an end at a second side of the switch electrode is formed with a free terminal,
wherein the end at the first side of the switch electrode and the end at the second side of the switch electrode are both spaced apart from the heater, and
wherein a portion of the switch electrode is disposed nearer to a heater side than are both the end at the first side of the switch electrode and the end at the second side of the switch electrode.

17. The camera module of claim 16,
wherein the end at the second side of the switch electrode is disposed nearer to the heater side than is the end at the first side of the switch electrode.

18. A camera module, comprising:
a retainer;
an outermost lens disposed within the retainer;
a heater disposed on a surface of the outermost lens;
a barrel disposed within the retainer and under the outermost lens;
a plurality of inner lenses accommodated into the barrel;

a PCB (Printed Circuit Board) disposed under the plurality of inner lenses with an image sensor;

a spacer interposed between the barrel and the outermost lens;

a switch electrode that selectively comes into contact with the heater disposed at the spacer; and a conductive line electrically connecting the switch electrode to the PCB and extended from a lateral surface of the spacer, wherein the conductive line is disposed between the barrel and retainer, wherein a current is supplied to the heater through the switch electrode when the switch electrode and the heater are in contact with each other, wherein the current supply to the heater is cut off when the switch electrode and the heater are spaced apart from each other, wherein the switch electrode is spaced apart from the heater when the outermost lens reaches a predetermined temperature or higher, and wherein the barrel includes a conductive line receptor through which the conductive line passes.

19. The camera module of claim 18, wherein the conductive line receptor includes a groove part formed by allowing an outer circumferential surface of the barrel to be recessively concaved in toward an inner side.

* * * * *